US009790368B2

(12) United States Patent
Henglein et al.

(10) Patent No.: US 9,790,368 B2
(45) Date of Patent: Oct. 17, 2017

(54) PEARLESCENT PIGMENTS COATED WITH MIXED INORGANIC/ORGANIC LAYERS AND METHOD FOR THE PRODUCTION THEREOF

(71) Applicant: Eckart GmbH, Hartenstein (DE)

(72) Inventors: Frank Henglein, Nürnberg (DE); Stefan Trummer, Nürnberg (DE); Ulrich Schmidt, Hersbruck (DE); Günter Kaupp, Neuhaus (DE); Peter Krüger, Ludwigsfeld (DE)

(73) Assignee: ECKART GMBH (DE)

( * ) Notice: Subject to any disclaimer, the term of this patent is extended or adjusted under 35 U.S.C. 154(b) by 331 days.

(21) Appl. No.: 14/643,382

(22) Filed: Mar. 10, 2015

(65) Prior Publication Data
US 2015/0183995 A1    Jul. 2, 2015

Related U.S. Application Data

(63) Continuation of application No. 12/280,398, filed as application No. PCT/EP2007/001515 on Feb. 22, 2007, now Pat. No. 8,980,976.

(30) Foreign Application Priority Data

Feb. 24, 2006 (DE) .................. 10 2006 009 131

(51) Int. Cl.
B32B 5/16        (2006.01)
C09C 1/00        (2006.01)
C09B 67/00       (2006.01)

(52) U.S. Cl.
CPC ........ C09C 1/0021 (2013.01); C09B 67/0098 (2013.01); C09C 1/0015 (2013.01); C09C 1/0024 (2013.01); C01P 2006/66 (2013.01); C09C 2200/102 (2013.01); C09C 2200/1004 (2013.01); C09C 2200/301 (2013.01); C09C 2200/307 (2013.01); C09C 2200/409 (2013.01); C09C 2220/10 (2013.01)

(58) Field of Classification Search
CPC ... C09C 1/0021; C09C 1/0024; C09C 1/0015; C09B 67/0098
See application file for complete search history.

(56) References Cited

U.S. PATENT DOCUMENTS

| | | | |
|---|---|---|---|
| 4,323,554 A | 4/1982 | Bernhard | |
| 5,194,366 A | 3/1993 | Grubb | |
| 5,332,767 A | 7/1994 | Reisser et al. | |
| 5,472,491 A | 12/1995 | Duscheck et al. | |
| 5,759,255 A | 6/1998 | Venturini et al. | |
| 6,176,918 B1 | 1/2001 | Glausch et al. | |
| 6,488,758 B2 | 12/2002 | Glausch et al. | |
| 6,949,292 B2 | 9/2005 | Bottcher et al. | |
| 7,169,222 B2 | 1/2007 | Bruckner et al. | |
| 7,172,812 B2 | 2/2007 | Greiwe et al. | |
| 8,980,976 B2* | 3/2015 | Henglein ............ C09B 67/0098 523/200 |
| 9,000,068 B2* | 4/2015 | Trummer .............. C09C 1/0021 523/200 |
| 2004/0226480 A1 | 11/2004 | Greiwe et al. | |
| 2005/0058939 A1 | 3/2005 | Daga et al. | |
| 2005/0223940 A1 | 10/2005 | Seeger et al. | |
| 2006/0046057 A1 | 3/2006 | Huber et al. | |
| 2008/0249209 A1 | 10/2008 | Trummer et al. | |
| 2009/0252772 A1 | 10/2009 | Henglein et al. | |
| 2009/0264575 A1 | 10/2009 | Henglein et al. | |
| 2010/0298469 A1 | 11/2010 | Kaupp et al. | |

FOREIGN PATENT DOCUMENTS

| | | |
|---|---|---|
| CA | 2329976 | 11/1999 |
| DE | 40 30 727 A1 | 4/1992 |
| DE | 40 39 593 A1 | 6/1992 |
| DE | 196 18 569 A1 | 11/1997 |

(Continued)

OTHER PUBLICATIONS

International Search Report dated Sep. 11, 2007, issued in correponding PCT Application No. PCT/EP2007/001515.
G. Pfaff: "Perlglanzpimente," Chem.I.U.Zeit, vol. 31, No. 1, 1997, pp. 6-16, XP002447405. Seite 10, linke Spalte.
KEN-REACT Reference Manual Titanate, Zirconate and Aluminum Coupling Agents, 2. Uberarbeitete Aufkage, Sommer 1993, pp. 2-21.
Hans-Georg Elias, "Makromolekule" 4. Auflage 1981, Huthig & Wepf Verlag Basel (with English translation).
U.S. Appl. No. 12/280,202, filed Aug. 21, 2008, entitled "Weather-Resistant Pearlescent Pigments Based on Small Thin Glass Plates, and Method for the Production Thereof," which shares the same priority filing date, common inventors and common assignee as the present application.
Opposition against European Patent No. 1874874 filed on Aug. 19, 2009 by BASF Catalysts LLC (English language).
Opposition against European Patent No. 1874874 filed on Aug. 19, 2009 by Merck Patent GmbH (English language translation).
Machine Translation of WO 20040292284.

(Continued)

Primary Examiner — Hannah Pak
(74) Attorney, Agent, or Firm — Ostrolenk Faber LLP

(57) ABSTRACT

The invention relates to platelet-shaped pearlescent pigments that are coated with at least one mixed inorganic/organic layer for improving their application properties, and of these, particularly their mechanical properties, and to methods for the production thereof and to the use thereof. The said mixed inorganic/organic layer comprises at least one at least partially crosslinked inorganic metal-oxide component and an organic component. The organic component is at least one organic oligomer and/or polymer, which is covalently bonded, at least in part, to the inorganic network via network formers, wherein the coating comprises at least one mixed inorganic/organic layer, which mixed mixed layer comprises, at least in part, an inorganic network having one or more inorganic oxide component(s) and at least one organic component, the organic component being, at least in part, an organic oligomer and/or polymer covalently bonded, at least in part, to the inorganic network via one or more organic network formers. The invention also relates to a method for the production of such pearlescent pigments.

22 Claims, No Drawings

(56) References Cited

FOREIGN PATENT DOCUMENTS

| | | |
|---|---|---|
| DE | 196 39 783 A1 | 4/1998 |
| DE | 198 20 112 A1 | 11/1999 |
| DE | 198 38 241 A1 | 2/2000 |
| DE | 102 43 438 A1 | 3/2004 |
| DE | 103 48 174 A1 | 5/2004 |
| EP | 0 268 918 A1 | 6/1988 |
| EP | 0 342 533 | 11/1989 |
| EP | 0 477 433 A2 | 4/1992 |
| EP | 0 492 223 A2 | 7/1992 |
| EP | 0 515 602 B1 | 12/1992 |
| EP | 0 632 109 A1 | 1/1995 |
| EP | 0 632 109 B1 | 1/1995 |
| EP | 1 084 198 B1 | 3/2001 |
| EP | 1 203 794 B1 | 5/2002 |
| WO | WO 92/10545 | 6/1992 |
| WO | WO 97/29059 | 8/1997 |
| WO | WO 99/57204 | 11/1999 |
| WO | WO 03/095564 A1 | 11/2003 |
| WO | WO 2004/092284 | 10/2004 |
| WO | WO 2004/092284 A | 10/2004 |

\* cited by examiner

PEARLESCENT PIGMENTS COATED WITH MIXED INORGANIC/ORGANIC LAYERS AND METHOD FOR THE PRODUCTION THEREOF

CROSS-REFERENCE TO RELATED APPLICATIONS

The present application is a continuation of prior U.S. patent application Ser. No. 12/280,398, filed Mar. 3, 2009, by Frank Henglein, Stefan Trummer, Ulrich Schmidt, Günter Kaupp and Peter Krüger entitled "PEARLESCENT PIGMENTS COATED WITH MIXED INORGANIC/ORGANIC LAYERS AND METHOD FOR THE PRODUCTION THEREOF," which is a 35 U.S.C. §371 National Phase conversion of International Application No. PCT/EP2007/001515, filed Feb. 22, 2007, which claims priority of German Patent Application No. 10 2006 009 131.0, filed Feb. 24, 2006. The PCT International Application was published in the German language. The contents of each of the patent applications above-listed are incorporated in full herein by reference.

TECHNICAL FIELD

The invention relates to platelet-shaped pearlescent pigments that are coated with at least one mixed inorganic/organic layer for improving their application properties, and of these, particularly their mechanical properties, and to methods for the production thereof and to the use thereof. The said mixed inorganic/organic layer comprises at least one at least partially crosslinked inorganic metal-oxide component and an organic component. The organic component is at least one organic oligomer and/or polymer, which is covalently bonded, at least in part, to the inorganic network via network formers.

BACKGROUND OF THE INVENTION

Pearlescent pigments comprise a platelet-shaped substrate of low refractive index, such as mica, and one or more highly refractive oxide layers. The highly refractive oxide layers used most frequently are titanium dioxide and iron oxides. The optical effect of pearlescent pigments is based on interference effects and their platelet-shaped structure. As a result of their structure, the pearlescent pigments have an orientation in the application medium that is parallel to the substrate. The lamellar structure of the pearlescent pigments oriented in the application medium in turn causes the effect-imparting properties thereof, such as the perception of interference colors and a color flop. The specific optical effect is substantially determined by the type and thickness of the oxide layer and the particle size and particle size distribution of the pearlescent pigments. But due to their platelet-shaped structure, pearlescent pigments are particularly sensitive to the influence of mechanical forces and shearing forces. Extremely vigorous shear stresses can damage the highly refractive oxide coatings on their substrate by causing fracture thereof and thereby adversely affecting the effect-imparting properties. This is manifested, for example, in their susceptibility to damage when pearlescent pigments are incorporated into plastics materials or the general necessity to work pearlescent pigments into wet paint in a gentle manner, in contrast to standard colored pigments. When incorporated into plastics, pearlescent pigments are extruded into a plastic melt. Flaking of the oxide coatings leads to a reduced transparency of the thus pigmented plastics material and to reduced luster thereof.

However, unlike colored pigments, pearlescent pigments cannot be incorporated into the basecoat of powder-based coating materials by extrusion with subsequent grinding in a pinned-disk mill. This would usually comminute them in such a way that the characteristic optical effects would be virtually completely lost.

Another critical aspect relates to the weather stability of pearlescent pigments. Due to the photocatalytic activity of titanium dioxide, the binder of the topcoat undergoes degradation, for example, in automobile lacquers. Pearlescent pigments coated with titanium dioxide must therefore be provided with suitable protective layers. However, protective layers that also improve the mechanical properties of the pigment have hitherto been difficult to find.

For a relatively long time, pearlescent pigments have therefore been provided with purely inorganic or purely organic three-dimensionally crosslinked coatings. These coatings usually serve as protective layers, but they also have a mechanically stabilizing effect. Furthermore, pearlescent pigments used in powder coating materials can be made suitably electrostatically chargeable by using dielectric coatings of this type.

The advantageous properties of the purely inorganic or purely organic three-dimensionally crosslinked coatings of pearlescent pigments must be distinguished from various other surface treatments. Surface treatments of this type always aim at improving application properties as influenced by the surface chemistry of the pearlescent pigments.

Thus, an organic surface modification consisting of, for example, inorganic coatings on pearlescent pigments has been performed thus far only in the form of a surface modification. DE 198 20 112 A1 describes reactive organic orientation aids, one functional group of which can chemically bind to the surface of a pearlescent pigment and the other functional group of which can bind to the coating material. The organic orientation aids are applied to pearlescent pigments, which have been coated with inorganic oxide layers or organic polymer layers. According to the teaching of DE 198 20 112 A1, however, no mixed layer of an inorganic oxide/hydroxide and an organic oligomer and/or polymer is formed. The organic orientation aids used merely change the surface properties of the pearlescent pigments. This involves achieving the best possible attachment of the pigment to the binder of the coating material. This favorably influences the orientation of the platelet-shaped pearlescent pigment in the coating material, which is very essential to the optical effect and other technological application properties such as condensation water climate stability and dispersability in the coating system.

DE 196 39 783 A1 describes modified pearlescent pigments based on a platelet-shaped substrate which is coated with metal oxides and which contains on the topmost metal oxide layer a covering layer composed of at least two oxides, oxide mixtures or mixed oxides of silica, alumina, cerium oxide, titanium oxide, or zirconium oxide and a water-based oligomeric silane system.

"An oligomeric silane system" in this case means a system of different organofunctional silanes, which are linked to one another via inorganic —Si—O—Si— units. But the aforementioned document does not describe oligomers in which the organic functions of the silanes are covalently bonded to one another. Silane systems of this kind therefore cannot be used to form an organic oligomer and/or polymer network.

EP 632 109 B1 describes a pearlescent pigment coating comprising at least three layers. The first layer consists of $SiO_2$. The second layer consists of at least one hydroxide or hydrated oxide of the elements cerium, aluminum, or zirconium. The third layer consists of one or more oxides/hydroxides of the elements Ce, Al, or Zr and an organic coupling agent. Organically modified silanes are mentioned inter alia as coupling agents. Coatings of such kind give rise to weather-resistant pearlescent pigments having improved application properties. It is clear from EP-A-0 268 918 and EP-A-0 342 533 that the weather resistance, that is to say, the suppression of the photoactivity of the titanium dioxide layer, is substantially the result of deposition of oxides/hydroxides of the elements Ce, Al, or Zr.

The coatings further described in DE 196 39 783 A1 and EP 632 109 B1 act as a surface modification. This surface modification aims to retain, on the one hand, advantages in terms of technological application properties, such as improved pourability and, on the other hand, very good dispensability, color properties, low formation of microbubbles, luster, and stability in water-thinnable coating systems.

But the document does not describe mixed layer precipitation, in which the organic components are oligomerized/polymerized with each other and thus result in the formation of an organic network within the inorganic network.

Pearlescent pigments can be improved in very many ways with regard to their application properties with the aid of a coating comprising $SiO_2$ or other inorganic materials and are thus adapted for a wide variety of applications. The disadvantage of these purely inorganic coatings, however, is their intrinsic brittleness. It has been found that high mechanical stresses can damage these layers, which results in a loss of the desired properties.

Mechanical damage of the protective layer can likewise occur when pearlescent pigments are dispersed in a coating system too vigorously or when pearlescent pigments are dispersed in extruders for applications in plastics materials.

Frequently, optical losses caused by mechanical damage to the pearlescent pigments can be found in particular when pearlescent pigments are used in rigid plastics such as polycarbonate.

EP 515 602 (cf. DE 4 039 593) describes surface-modified platelet-shaped substrates in which organic aluminum and/or silicon compounds are anchored to the particles with the controlled application of moisture or heat. Crosslinking of the organic components after deposition onto the pigment surface is not described in the aforementioned document. Iron oxide pearlescent pigments treated according to this method are reported to have greater protection from abrasion. In contrast, EP 1 203 794 mentions that despite the stabilizing aftercoating, which is composed of 3 layers and is described in EP 0 632 109 in detail, the pearlescent pigments, especially those based on mica and coated with iron(III) oxide, are unsuitable or only limitedly suitable for use in all fields involving extreme stresses. According to the teaching of EP 1 203 794, mechanical stability can be improved only in a very complex method by the deposition of an additional, adhesion-promoting fourth layer.

SUMMARY OF THE INVENTION

It is an object of the present invention to provide pearlescent pigments having improved mechanical properties. It is also desirable for the pearlescent pigments to have good optical properties in the application medium even after the action of strong shearing forces. Furthermore, the pearlescent pigments are required to have a protective layer for providing, in particular, weather stability.

The object(s) on which the present invention is based are achieved by a pearlescent pigment as defined in claim 1.

According to the invention, it is essential that the pearlescent pigment comprise at least one coating comprising a mixed inorganic/organic layer, which comprises, at least in part, an inorganic network having one or more inorganic oxide component(s) and at least one organic component, the organic component being at least in part an organic oligomer and/or polymer covalently bonded, at least in part, to the inorganic network via one or more organic network formers.

The object of the invention is further achieved by the provision of a method for producing pearlescent pigments comprising a mixed inorganic/organic layer, said method comprising the following steps:

causing at least one inorganic network former and at least one organic network former and at least one reactive organic component to react in liquid phase with the formation of a coating composition, applying the coating composition as a mixed layer to platelet-shaped transparent substrates, the platelet-shaped transparent substrates being added to the liquid phase prior to, during, or following the addition or reaction of at least one inorganic network former and the at least one organic network former and the at least one reactive organic component, the mixed layer comprising, at least in part, an inorganic network having one or more inorganic oxide component(s) and at least one organic component, the organic component being, at least in part, an organic oligomer and/or polymer covalently bonded, at least in part, to the inorganic network.

DETAILED DESCRIPTION OF CERTAIN EMBODIMENTS OF THE INVENTION

The at least one inorganic network former, the at least one organic network former, and the at least one reactive organic component can be mixed together in any desired order. The reaction conditions must, however, be set such that the components can enter into reaction. Preferably, the components interreact by hydrolysis and/or condensation. The components are therefore hydrolyzable and/or condensable. The coating composition formed during the hydrolysis and/or condensation is then applied to the pearlescent pigment surface, preferably by precipitation.

The pearlescent pigments can be added prior to, during, or following the addition or reaction of the at least one inorganic network former and the at least one organic network former and the at least one reactive organic component to the liquid phase. The pearlescent pigments can thus be present initially in a liquid phase and the inorganic network former (s), the organic network former(s), and the reactive organic component(s) can then be added, in any order. The pearlescent pigments can also be added to the coating composition during the reaction or after the reaction. Depending on the order of addition and the chosen reaction conditions, a predominantly inorganic or a predominantly organic layer can first be applied to the pearlescent pigment surface before the application of the mixed inorganic/organic layer. The inorganic/organic layer may naturally also be applied directly to the uncoated or pre-coated pearlescent pigment surface.

According to a preferred development, the method of the invention comprises the following steps:

(a) providing a reaction mixture of platelet-shaped transparent substrates in a liquid phase,
(b1) adding at least one inorganic network former to the reaction mixture provided in step (a),
(c1) hydrolyzing and/or condensing the inorganic network former added in step (b1),
(d1) adding at least one reactive organic network former and at least one reactive organic component prior to, during, and/or following the hydrolysis and/or condensation carried out in step (c1),
or
(b2) adding at least one reactive organic network former and at least one reactive organic component to the reaction mixture provided in step (a),
(c2) adding at least one hydrolyzable and/or condensable inorganic network former to the reaction mixture obtained in step (b2),
(d2) hydrolyzing and/or condensing the inorganic network former added in step (c2),
and
(e) causing the hydrolyzed and/or condensed inorganic network former to react with the reactive organic network former and the reactive organic component with concurrent and/or subsequent deposition of a mixed inorganic/organic layer,
(f) optionally separating the platelet-shaped transparent substrates coated in step (e) from the reaction mixture.

For the purposes of the invention, an "inorganic network former" is taken to mean that the inorganic network former can form an inorganic network. An inorganic network former can be, for example, a hydrolyzable metal salt or a fully hydrolyzable organometallic compound.

For the purposes of the invention, an "organic network former" is taken to mean that the organic network former can, together with a reactive organic component, form an organic or organometallic network. An organic network former is preferably an organometallic compound, which is only partially hydrolyzable and therefore cannot form an inorganic network.

The object on which the present invention is based is also achieved by the use of the platelet-shaped pearlescent pigment as defined in any one of claims 1 to 21 in pigmented coating systems, automobile lacquers, paints, printing inks, powder paints, architectural coating compositions, plastics, security printing inks, ceramics, glass, or cosmetic preparations.

The object on which the present invention is based is further achieved by the use of the platelet-shaped pearlescent pigments as defined in any one of claims 1 to 21 as a laser marker.

It has been found, surprisingly, that the color stability of (pearlescent) mica pigments coated with iron oxide is significantly improved when they are incorporated into a polycarbonate melt by extrusion, if the pearlescent pigments have been subsequently coated with a mixed inorganic/organic layer according to the invention. Unlike the prior art, this improvement in color stability occurs although only one additional top layer has been applied. This is attributable to the increased elasticity of the mixed inorganic/organic top layer in comparison with metal oxide layers having a purely inorganic architecture. The advantage of the coating of the invention is particularly clearly manifested under increased mechanical stresses, such as are present, for example, during co-extrusion of the pearlescent pigment and polycarbonate granules.

Furthermore, it is possible to achieve improved weather stability of pearlescent pigments with the aid of a mixed inorganic/organic layer in comparison with purely inorganic or organic layers.

The incorporation of organic oligomers and/or polymers into inorganic oxide layers therefore allows multifarious improvement in the application properties of pearlescent pigments.

The subject matter of the present invention is therefore a pearlescent pigment which has at least one coating comprising a mixed inorganic/organic layer, said mixed layer comprising, at least in part, an inorganic network having one or more inorganic oxide component(s) and at least one organic component, and the organic component is, at least in part, an organic oligomer and/or polymer which is covalently bonded, at least in part, to the inorganic network via one or more organic network formers.

The at least partial covalent bonding of the inorganic oxide network to the organic oligomer and/or polymer takes place via at least one organic network former. The network formers are reagents which can bind to both the inorganic network and to the organic oligomer and/or polymer.

According to a preferred embodiment, the at least partial covalent bonding of the inorganic oxide component and organic oligomer and/or polymer takes place, at least in part, via one or more organic network formers, said organic network former preferably having the general formula (I)

in which X is a hydrolyzable group, following the hydrolysis of which a covalent bond can form between the organic network formers and the inorganic network, and $R^1$ is a reactive organic group that can be covalently bonded to the organic oligomer and/or polymer,
$R^2$ and $R^3$ are independently an organic group, which can be covalently bonded to the organic oligomer and/or polymer, provided that
n, m and o are integers, where n+m+o=1 to 3 and n=1 to 3, m=0 to 2 and o=0 to 2,
and/or the general formula (II)

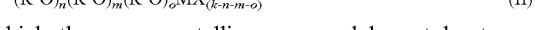

in which the organometallic compound has at least one hydrolyzable group X, following the hydrolysis of which a covalent bond can form between the organic network former and the inorganic network,
at least one organic radical $R^1$, which stands for a reactive organic group that can be covalently bonded to the organic oligomer and/or polymer, and $R^2$ and $R^3$ independently denote an organic group that can be covalently bonded to the organic oligomer and/or polymer, where
k is the formal oxidation number of M,
M stands for Al, Zr, or Ti,
n is an integer from 1 to (k−1),
m is an integer from 0 to (k−2),
o is an integer from 0 to (k−2), and
where n+m+o is an integer from 1 to k−1.

For the purposes of the invention, the term "formal oxidation number" is taken to mean that aluminum may have the oxidation number III, zirconium may have the oxidation number II, III, or IV, and titanium may have the oxidation number II, III, or IV. Preferably both zirconium and titanium have the oxidation number IV.

The reactive group $R^1$ or the reactive organic radical $R^1$ is polymerizable, according to a preferred development of the invention. The radical $R^1$ can be polymerizable, for example, with other radicals $R^1$ so that the organic network former, as such, may be present in an oligomerized or polymerized form in the mixed inorganic/organic layer. The radical $R^1$ can, however, also be polymerizable with other monomers so that the organic network former in the mixed inorganic/organic layer may be present in a copolymerized form in a polymer that includes other monomers.

Organofunctional silanes are preferred, in particular, for use as organic network formers. The organofunctional silanes can bind to the inorganic network following the hydrolysis of the hydrolyzable group X. By way of hydrolysis, group X is usually substituted by an OH group, which then forms a covalent bond with OH groups in the inorganic network with condensation. Group X is preferably halogen, hydroxyl, alkoxy having from 1 to 10 carbon atoms, which may be linear or branched in the carbon chain, and mixtures thereof.

The organic network former binds at least via the functional group $R^1$ with, or to, the organic oligomer and/or polymer. $R^1$ is preferably a reactive functional group.

The reactive, preferably polymerizable, organic radical $R^1$ preferably comprises one or more substituents selected from the group consisting of amino groups, hydroxyl groups, thiol groups, epoxy groups, acrylate groups, methacrylate groups, vinyl groups, allyl groups, alkenyl groups, alkynyl groups, carboxyl groups, carboxylanhydride groups, isocyanate groups, cyanate groups, ureido groups, carbamate groups, and mixtures thereof. The organic radical $R^1$ is preferably bonded to the central silicon atom via a covalent C—Si bond.

The radicals $R^2$ and $R^3$ are independently selected from the group consisting of H silanes, ($C_1$-$C_{40}$)-alkyl silanes, fluorinated ($C_1$-$C_{40}$)-alkyl silanes, partially fluorinated ($C_1$-$C_{40}$)-alkyl silanes; ($C_2$-$C_{40}$)-alkenyl silanes, ($C_2$-$C_{40}$)-alkynyl silanes; ($C_6$-$C_{36}$)-aryl silanes, fluorinated ($C_6$-$C_{36}$)-aryl silanes, partially fluorinated ($C_6$-$C_{36}$)-aryl silanes; ($C_7$-$C_{40}$)-alkylaryl silanes, ($C_7$-$C_{40}$)-arylalkyl silanes, fluorinated ($C_7$-$C_{40}$)-alkylaryl silanes, partially fluorinated ($C_7$-$C_{40}$)-alkylaryl silanes; ($C_8$-$C_{40}$)-alkenylaryl silanes, ($C_8$-$C_{40}$)-arylalkynyl silanes, ($C_8$-$C_{40}$)-alkynylaryl silanes; ($C_5$-$C_{40}$)-cycloalkyl silanes, ($C_6$-$C_{40}$)-alkylcycloalkyl silanes, and ($C_6$-$C_{40}$)-cycloalkylalkyl silanes, which can each be substituted by amino groups, hydroxyl groups, thiol groups, epoxy groups, acrylate groups, methacrylate groups, vinyl groups, allyl groups, alkenyl groups, alkynyl groups, carboxyl groups, carboxylanhydride groups, isocyanate groups, cyanate groups, ureido groups, carbamate groups, and/or ester groups, and O, N, and S can be present as heteroatoms in the carbon chains and carbon ring systems. The radicals $R^2$ and $R^3$ preferably have chain lengths of from 3 to 20 carbon atoms, more preferably from 5 to 18 carbon atoms. The radicals $R^2$ and $R^3$ may be branched and/or linear. In the case of alkyl chains, the latter can be interrupted by heteroatoms such as O, S, or N.

The organic group or radical $R^1$ likewise has a reactivity that allows for the formation of a covalent bond to the organic oligomer and/or polymer.

The organic groups or radicals $R^2$ and/or $R^3$ can also have a reactivity that allows for the formation of a covalent bond to the organic oligomer and/or polymer. Unlike the organic group $R^1$ or the radical $R^1$, it is not necessary for a covalent bond to be formed from the radicals $R^2$ and/or $R^3$ to the organic oligomer and/or polymer. In this respect, the radicals $R^2$ and/or $R^3$ may also be non-reactive. Particularly, the radicals $R^2$ and $R^3$ are not polymerizable under the reaction conditions used. It is therefore preferred that the radicals $R^2$ and $R^3$ do not polymerize with one another, unlike the radical $R^1$ and, in particular, cannot be caused to react with monomers to form a polymer, under the reaction conditions used.

Suitable organofunctional silanes are, for example, many representatives produced by Degussa (Untere Kanalstrasse 3, D-79618 Rheinfelden) and products sold under the trade name "Dynasylan". For example, 3-methacryloxypropyl trimethoxysilane (Dynasylan MEMO) can be used to form a (meth)acrylate or polyester, vinyl tri(m)ethoxysilane (Dynasylan VTMO or VTEO) to form a vinyl polymer, 3-mercaptopropyl tri(m)ethoxysilane (Dynasylan MTMO or 3201) for copolymerization in rubber polymers, aminopropyl trimethoxysilane (Dynasylan AMMO) or N2-aminoethyl-3-aminopropyl trimethoxysilane (Dynasylan DAMO) to form a β-hydroxylamine or 3-glycidoxypropyl trimethoxysilane (Dynasylan GLYMO) to form a urethane network or polyether network.

Other examples of silanes with vinyl or (meth)acrylate functionalities are: isocyanato triethoxy silane, 3-isocyanatopropoxyl triethoxy silane, vinyl ethyl dichlorosilane, vinyl methyl dichlorosilane, vinyl methyl diacetoxy silane, vinyl methyl diethoxy silane, vinyl triacetoxy silane, vinyl trichlorosilane, phenyl vinyl diethoxy silane, phenyl allyl diethoxy silane, phenyl allyl dichlorosilane, 3-methacryloxypropyl triethoxy silane, methacryloxy propyl trimethoxy silane, 3-acryloxypropyl trimethoxy silane, 2-methacryloxyethyl tri-(m)ethoxy silane, 2-acryloxyethyl tri(m)ethoxy silane, 3-methacryloxypropyl tris(methoxyethoxy)silane, 3-methacryloxypropyl tris(butoxyethoxy)silane, 3-methacryloxypropyl tris(propoxy)silane, 3-methacryloxypropyl tris(butoxy)silane.

Furthermore, so-called α-silanes such as those produced and sold by Wacker, Burghausen, Germany can be used.

In these silanes, the reactive organic groups are separated from the Si-Atom by only one methylene unit. They are distinguished from the conventional silanes by their accelerated hydrolysis and condensation rates.

Suitable organofunctional titanates, zirconates, or aluminates can also be used as organic network formers such as those produced and supplied by Kenrich Petrochemicals under the trade name Ken-React® (supplied by Nordmann, Rassmann GmbH, Kajen 2, 20459 Hamburg). In particular, the coupling agents specified on pages 2 to 21 of the KEN-REACT® Reference Manual: Titanate, Zirconate and Aluminate Coupling Agents, $2^{nd}$ revised edition, Summer 1993, can in most cases be used as organic network formers. The disclosure on pages 2 to 21 of the aforementioned KEN-REACT® Reference Manual is incorporated herein by reference.

These organic network formers preferably comprise alkoxy, but also hydroxyl or halogen, as the hydrolyzable or condensable group X. In the case of alkoxy, a cyclic group, which is bonded to the central atom M via two oxygen atoms such as oxoethylene or cyclopentyl, may also be present. In this case, the central atom M has only two other substituents. The hydrolyzable group can also be a component of a cyclic unit, which is coordinatively bonded via other oxygen atoms to the central atom, and thus cannot be eliminated from the molecule following hydrolysis.

In other forms, two organophosphito ligands coordinatively bonded to the central atom may be present. In this case, four alkoxy ligands are bonded to the central atom.

These Al-organic, Zr-organic or Ti-organic network formers can be present in the form of chelate complexes or coordination complexes. The ligands can contain heteroatoms, preferably N, S, or O.

Examples of such organic network formers are (see KEN-REACT® Reference Manual—Titanate, Zirconate and Aluminate Coupling Agents by Salvatore J. Monte): isopropyldimethacrylisostearoyl titanate(IV) (KR7), alkoxytrimethacryl titanate (KR 33DS), isopropyltri(N-ethylenediamino)ethyl titanate(IV) (KR 44), tris(2-propenoato-0)methoxyl (KR 39DS), methacrylatotriisopropoxy titanate, methacryloxyethylacetoacetonato triisopropoxy titanate, (2-methacryloxyethoxy)-triisopropoxy titanate, titanium (IV) 2,2-bis(2-propenolatomethyl)butanolato-tris(dioctyl) pyrophosphato-0 (LICA 38J), methacryloxyethylacetoacetonatotri-n-propoxy zirconate, neopentyl(diallyl)oxy-tri(N-ethylenediamino)ethyl zirconate(IV) (NZ 44), and 9-octadecenylacetoacetatodiisopropoxy aluminate.

The inorganic component of the mixed layer preferably consists of a metal oxide and/or hydrated metal oxide and/or metal suboxide and/or metal hydroxide, which form, at least in part, a two-dimensional or three-dimensional network.

The inorganic fraction of the mixed layer comprising metal oxide and/or metal suboxide and/or metal hydroxide is selected from the following group: silicon, aluminum, titanium, zirconium, cerium, chromium, manganese, antimony, zinc, boron, magnesium, iron, and mixtures and alloys thereof.

The inorganic network-forming starting compounds for these oxides are preferably alkoxides, hydroxides, and halides of these compounds.

The inorganic network formers preferably have the general formula $$MX_n,$$

in which X is independently an optionally hydrolyzable and/or condensable group consisting of halogen, hydroxyl or alkoxy containing from 1 to 10 carbon atoms, and the alkoxy group may comprise heteroatoms, preferably O, S, and/or N, in the carbon chain.

The metal M is preferably Si, Al, Ti, Zr, B, Fe, Mg, Mn, Sb, Cr, Zn, and/or Ce, provided that
when M is Sb(V), n=5,
and when M is Si, Ti or Zr, n=4,
and when M is Al, Ce, Fe(III), Sb(III) or B, n=3,
and when M is Zn, Fe(II) or Mg, n=2.
When M is Al, Ti, Zr, or Fe, the groups X can stand for chelating ligands such as acetylacetonates or acetoacetate esters, for example.

Preferably, inorganic network formers are used in which M is Si, Al, Ti, and/or Zr and X stands for alkoxy groups containing from 1 to 6 carbon atoms, and the alkoxy group in the carbon chain can comprise heteroatoms, preferably O, S, and/or N. Very preferably, tetraalkoxy silanes, particularly tetramethoxy silanes, and/or tetraethoxy silanes, are used to form an $SiO_2$ layer.

Pearlescent pigments, particularly those containing one or more iron oxide layers, which are provided with a preferred mixed layer of $SiO_2$ and acrylate and/or methacrylate, are mechanically very stable. Pearlescent pigments containing one or more titanium dioxide layers are mechanically very stable and additionally weather-resistant due to this preferred mixed layer. It has been found that these properties may be improved further if tetraethoxysilane, acrylic silane, and acrylic monomer and/or methacrylic monomer are added during the creation of the inorganic network, for example by hydrolysis. In this reaction, there takes place firstly coupling of acrylic silane to the $SiO_2$ network undergoing formation and secondly polymerization of acrylic monomer and/or methacrylic monomer and copolymerization of the acrylic group of the acrylic silane with the acrylic oligomer and/or acrylic polymer and/or methacrylic oligomer and/or methacrylic polymer being formed from acrylic monomers and/or methacrylic monomers.

The precipitation of purely inorganic coatings onto pearlescent pigments of such metal starting compounds usually takes place at specific pH's. These and other typical reaction conditions such as temperature or reaction time are known to the person skilled in the art.

If the metal oxide is precipitated from a suitable inorganic network former onto the platelet-shaped transparent substrate in the presence of suitable monomers and, optionally, polymerization initiators and organic network formers, then an inorganic oxide network and an organic oligomer and/or polymer can be formed simultaneously in a controlled manner. The inorganic network and the organic oligomers and/or polymers preferably exhibit interpenetration.

In a preferred development of the invention, both an inorganic and an organic network of oligomers and/or polymers are present, preferably exhibiting interpenetration.

Depending on the reaction conditions, the proportions of the educts used, and the kinetics of the reactions that take place, the mixed inorganic/organic layer may be substantially homogeneous. However, small portions of inorganic network and/or organic oligomer and/or polymer may also be present in the mixed layer.

For the purposes of the present invention, "organic oligomers" in the mixed layer are taken to mean the term usually employed in polymer chemistry: i.e. the linkage of from two to twenty monomer units (Hans-Georg Elias, "Makromolekuele" $4^{th}$ Edition 1981, Huethig & Wepf Verlag Basel). Polymers are linkages of more than twenty monomer units.

Due to the variety of organic monomers and the use of various oxides or oxide mixtures, basically a wide range of possible variations in the formation of a mixed inorganic/organic layer formation is given. The average chain length of the organic segments can be varied by varying the ratio of monomer concentration to the concentration of organic network formers. Coatings can thus be produced which impart the pearlescent pigments with properties customized in many respects. The average chain length of the organic segments is from 2 to 10,000 monomer units, preferably from 4 to 5,000 monomer units, more preferably from 10 to 1,000 monomer units and even more preferably from 40 to 200 monomer units.

Furthermore, particular preference is given to organic polymers having average chain lengths of from 21 to 15,000 monomer units, more preferably from 50 to 5,000 monomer units and most preferably from 100 to 1,000 monomer units, for use as the organic component.

The organic oligomer and/or polymer in the mixed layer is formed by skeleton molecules commonly used in organic polymer chemistry. Examples of these skeleton molecules are C—C bonds, amides, esters, acrylates, etc. Siloxanes are not used, since silane residues in the network formers serve to link the inorganic network to the organic network. Furthermore, the desired mechanical flexibility of the mixed layer can be achieved only by the incorporation of organic skeleton molecules.

The organic oligomer and/or polymer in the mixed layer can preferably be formed by polymerization of suitable monomers. The monomers can have functionalities selected from the group consisting of amino groups, hydroxyl groups, thiol groups, epoxy groups, acrylate groups, methacrylate groups, vinyl groups, allyl groups, alkenyl groups, alkynyl groups, carboxyl groups, carboxylanhydride groups, isocyanate groups, cyanate groups, ureido groups, carbamate groups, ester groups, and mixtures thereof.

In a preferred embodiment, the mixed inorganic/organic layer is created using organic network formers for covalent bonding of inorganic and organic networks and by polymerization of organic monomers. The use of silanes containing (meth)acrylate functions such as Dynasylan MEMO as organic network formers and the use of methacrylates as monomers is particularly preferred.

Crosslinking, i.e. multifunctional, (meth)acrylates are suitable for use as monomers or reactive oligomers or polymers. Examples of such compounds are:
tetraethylene glycol diacrylate (TTEGDA), triethylene glycol diacrylate (TIEGDA), polyethylene glycol-400-diacrylate (PEG400DA), 2,2'-bis(4-acryloxyethoxyphenyl)-propane, ethylene glycol dimethacrylate (EGDMA), diethylene glycol dimethacrylate (DEGDMA), triethylene glycol dimethacrylate (TRGDMA), tetraethylene glycol dimethacrylate (TEGDMA), butyl diglycol methacrylate (BDGMA), trimethylol propane trimethacrylate (TMPTMA), butane-1,3-diol dimethacrylate (1,3-BDDMA), butane-1,4-diol dimethacrylate (1,4-BDDMA), hexane-1,6-diol dimethacrylate (1,6-HDMA), 1,6-hexane-diol diacrylate (1,6-HDDA), dodecane-1,12-diol dimethacrylate (1,12-DDDMA), and neopentyl glycol dimethacrylate (NPGDMA).

Trimethylol propane trimethacrylate (TMPTMA) is particularly preferred.

These compounds are commercially available from Elf Atochem Deutschland GmbH, D-40474 Dusseldorf Germany or Rohm & Haas, In der Kron 4, 60489 Frankfurt/Main, Germany.

Non-crosslinking (meth)acrylates can also be used as monomers for the formation of the organic component, i.e. of the organic oligomer and/or polymer, of the mixed layer. Depending on other functional groups in these (meth)acrylates, a wide variety of likely variations in the chemical composition and thus also modifications of the application properties of the pearlescent pigments provided with a mixed layer are possible. Mixtures of crosslinking and monofunctional vinyl monomers and/or (meth)acrylate monomers are also possible.

Examples of monofunctional (meth)acrylates are: lauryl (meth)acrylate, allyl (meth)acrylate, propyl (meth)acrylate, isobornyl methacrylate, and hydroxyethylimidazoline methacrylate.

These compounds are commercially available from Elf Atochem Deutschland GmbH, Uerdingerstr. 4 D-40474 Dusseldorf or from Rohm & Haas, In der Kron 4, 60489 Frankfurt/Main, Germany.

The polymerization of vinyl-functional and/or (meth)acrylate-functional monomers in the formation of the mixed inorganic/organic layer can take place by means of thermal polymerization. The use of polymerization initiators, preferably free radical initiators, is more advantageous. These polymerization initiators are commercially available, and are usually organic or inorganic peroxides or diazonium compounds. Examples of such compounds are: acetylcyclohexane sulfonyl peroxide, bis(2,4-dichlorobenzoyl) peroxide, diisononanoyl peroxide, dioctanoyl peroxide, diacetyl peroxide, and dibenzoyl peroxide; peroxydicarbonates (e.g. diisopropyl peroxydicarbonate, di-n-butyl peroxydicarbonate, di-2-ethylhexyl peroxydicarbonate, dicyclohexyl peroxydicarbonate), alkyl peresters (e.g. cumyl perneodecanoate, tert-butyl-perneodecanoate, tert-amyl-perpivalate, tert-butyl-per-2-ethylhexanoate, tert-butyl perisobutyrate, tert-butylperbenzoate), dialkyl peroxides (e.g. dicumyl peroxide, tert-butylcumyl peroxide, 2,5-dimethylhexane-2,5-di-tert-butyl peroxide, di(tert-butylperoxyisopropyl)benzene, di-tert-butylperoxide, or 2,5-dimethylhexine-3-2,5-di-tert-butyl peroxide), perketals (e.g. 1,1'-bis(tert-butylperoxy)-3,3,5-trimethylcyclohexanone peroxide, methylisobutyl ketone peroxide, methylethyl ketone peroxide, acetylacetone peroxide), alkyl hydroperoxides (e.g. pinane hydroperoxide, cumene hydroperoxide, 2,5-dimethylhexane-2,5-dihydroperoxide, or tert-butyl hydroperoxide), azo compounds (e.g. 4,4'-azo-bis(4-cyanovaleric acid), 1,1'-azo-bis(cyclohexanecarboxylic nitrile), 1,1'-azo-bis(isobutyric amidine) dihydrochloride, 2,2'-azo-bis(isobutyric nitrile) or persulphates such as sodium peroxodisulphate and potassium peroxodisulphate. 2,2'-azo-bis(isobutyric nitrile) is particularly preferred.

These compounds are commercially available from Aldrich Chemie, D-89552, Steinheim.

Furthermore, the polymerization of vinyl-functional and/or (meth)acrylate-functional monomers for the formation of the mixed inorganic/organic layer can also be carried out by ATRP (atomic transfer radical polymerization) pertaining to living free-radical polymerization. Here, a silane compound, in which $R^1$ is provided with a terminal alkyl halide, preferably an alkyl bromide having an ester group in the a position, is used as the organic network former. Furthermore, Cu(I) salts, optionally in admixture with Cu(II) salts or metallic Cu, and suitable copper compound-complexing ligands are added. Details regarding the same are provided in DE 198 38 241 A1.

If epoxy silanes are used as organic network formers, these can be caused to react with multifunctional amines as crosslinkers. Other possible variations are additionally achieved if multifunctional epoxy compounds are used. Combinations of multifunctional epoxy compounds and multifunctional amino compounds are naturally also possible when using aminofunctional silanes as coupling agents.

Examples of commercially available multifunctional amines suitable for such reactions are 3,3-dimethyl-4,4-diaminodicyclohexyl methane, ethylene diamine, triethylene tetramine, meta-xylylene diamine, N-aminoethyl piperazine, 2-methyl-1,5-pentamethylene diamine, 1,2-diaminocyclohexane, and isophorone diamine.

Examples of suitable commercially available multifunctional epoxy compounds are butane-1,4-diol diglycidether, glycerine triglycidether, neopentylglycol diglycidether, pentaerythritol polyglycidether, hexane-1,6-diol diglycidether, polypropylene glycol diglycidether, and trimethylol propane triglycidether.

All these multifunctional amine compounds and epoxy compounds are commercially available from UPPC: (U. Pruemmer Polymer-Chemie GmbH; Muehlhalde 8 in D-88487 Baltringen).

In another embodiment of the invention, the organic network is not produced during the reaction. Instead, reactive organic oligomers and/or polymers, which have reactive groups allowing binding to the oxide network via the at least one group $R^1$ in the organic network formers are used as the organic component. In order to ensure an effective reaction with, in particular, group $R^1$ of the organic network formers, the oligomer and/or polymer can also be caused to react directly with the organic network former prior to incorporation into the mixed layer. For this purpose, the oligomers and/or polymers are dissolved in a suitable solvent, mixed with organic network formers and then caused to react. The organic oligomers and/or polymers coupled with the organic network former can then be caused to react with the metal oxide-forming compounds required for creating the inorganic network with the formation of the inorganic/organic mixed layer.

Examples of reactive organic oligomers and/or polymers, which may be incorporated directly into the inorganic network during the reaction, are silane-modified polyethylene imines or polybutadienes, or polyethylene oxide urethanes modified with aminosilane. In such compounds, particularly low molecular weights of from 100 g/mol to 1000 g/mol are preferred. Low molecular weight compounds of this type have many linkage points to the inorganic oxide network and thus result in homogeneously distributed mixed inorganic/organic layers.

Examples of such commercially available compounds are: trimethoxysilylpropyl-substituted polyethylene imine, dimethoxymethylsilylpropyl-substituted polyethylene imine, triethoxysilyl-modified polybutadiene, dimethoxymethylsilyl-modified polybutadiene, (N-triethoxysilylpropyl)-O-polyethylene oxide urethane and poly(trimethysilylpropine) (all supplied by, e.g., ABCR GmbH & Co. P.O. box 210135, Hansastr. 29c, D-76151 Karlsruhe, Germany). Another example is phenolformaldehyde oligomers modified with silanes, such as those produced and sold as Resols or Novolacks by Bakelite AG (Gennaer Straße2-4, D-58642 Iserlohn-Letmathe).

In another embodiment of the invention, those compounds may also be used as reactive oligomers and/or polymers which have reactive, preferably polymerizable functional groups. The polymerizable functional groups can be produced, for example, by a subsequent reaction of the oligomer and/or polymer (for example, by a polymer-analogous reaction). These reactive oligomers/polymers react with the functional organic groups of suitable organic network formers and are thus covalently bonded to, or into, the inorganic oxide network.

These reactive oligomers and/or polymers can be reactive polymers selected from the group consisting of polyacrylates, polymethacrylates, polyethers, polyesters, polyamines, polyamides, polyols, polyurethanes, and polyolefins.

Organic oligomers and/or polymers which are capable of being incorporated directly into the mixed layer via suitable functional groups are preferably those that have functional groups which, in terms of polymer chemistry, are compatible with those of the organic network formers. Thus, in the case of an epoxy group-containing silane, an epoxy resin or an amino-containing resin is used, in the case of (meth)acrylic group-containing silanes, (meth)acrylates are used, or if the functional groups of the organic oligomers/polymers are caused to react with the reactive groups $R^1$ of the organic network formers via condensation or addition mechanisms, then the functional groups are preferably appropriately adapted to one another. For example, epoxy-containing polymers can be caused to react particularly well with epoxy functionalized or amino functionalized silanes. In this way, the polymers are modified by alkoxy silanes and can thus react very well with, say, tetraalkoxy silanes to form mixed inorganic/organic layers.

Examples of prepolymers/preoligomers that can be used in this way are epoxy resin D.E.R: 330 (Dow Corning; Rheingaustr. 53 in D-65201 Wiesbaden, Germany), and polybutadiene/poly(2,3-epoxy)butadiene copolymer (supplied by Aldrich, D-89552 Steinheim, Germany).

In another preferred embodiment of the invention, the formation of the organic oligomer and/or polymer takes place within an inorganic oxide by specifically permitting only copolymerization of the functional groups in the organic network formers. Thus, for example, network formers in which the polymerizable group $R^1$ comprises methacrylate, acrylate, or vinyl groups, are polymerized or oligomerized by the addition of suitable polymerization initiators.

For example, prior to incorporation into an oxide network, epoxy-containing silanes can react with each other in a separate step to form oligomeric or polymeric polyether units. Prior to incorporation into the mixed inorganic/organic layer, a mixture of suitable epoxy-functionalized and amino-functionalized silanes can, for example, at least partially react to form oligomeric or polymeric β-hydroxyl amines and thus a quasi-two-dimensional organic network.

After oligomerization and/or polymerization, these silane mixtures can then be caused to react with the resulting oxide network to form a mixed inorganic/organic layer.

Mixed layers formed in this way preferably have a lower degree of polymerization in the case of the organic component than if additionally organic monomers are copolymerized, i.e. additionally added during polymerization.

Thus the additional use of organic monomers for forming the organic network is preferred, according to another embodiment of the invention.

In order to be able to make effective use of the advantageous effects of both the organic oligomer and/or the polymer and the inorganic oxide network, the organic fraction in the mixed inorganic/organic layer applied to a platelet-shaped substrate is preferably in a range of from 4% to 85% by weight, more preferably from 5% to 75% by weight, and still more preferably from 10% to 50% by weight, the percentages by weight being based on the weight of the entire mixed layer.

If the weight of the organic component is below 45%, the advantageous effects, that is to say, the effects improving the elasticity of the organic oligomer and/or polymer are hardly effective. On the other hand, if the weight of the organic fraction in the mixed layer exceeds 85%, the advantageous effects, that is to say, the effects improving the resistance of the inorganic component are lost.

These contents of the organic components can be easily determined by analysis based on the carbon content of the effect pigment.

In the case of a complex layer architecture containing additional purely organic or inorganic layers, it is recommended to use sputtering techniques in combination with surface-sensitive analytical methods such as ESCA and/or SIMS and, particularly in this case, TOF-SIMS, for analyzing such layers. Furthermore, NMR methods, such as $C^{13}$—NMR spectroscopy and $Si^{29}$-NMR spectroscopy, for example, can also be mentioned in this respect.

To ensure that the mixed inorganic/organic layer to be fully effective for the purpose of achieving mechanical stabilization and/or increased hydrophobization, the average thickness of the mixed layer must be at least 2 nm, preferably 3 nm, and still more preferably 10 nm. If the thickness of the mixed layer is below 2 nm, the advantageous effects of the mixed inorganic/organic layer are no longer noticeable.

Mechanical stabilization of the mixed inorganic/organic layer is also ensured in the case of very large layer thicknesses. Usually, the thickness of the mixed inorganic/organic layer is in a range of from approximately 10 nm to approximately 50 nm. However, the advantageous effects are still observable at a maximum layer thickness of 800 nm, preferably 700 nm, and still more preferably 600 nm.

Layer thicknesses exceeding these ranges excessively increase the overall thickness of the pearlescent pigments. In this case, the orientation ability of the pearlescent pigments in the application medium, as is essential for the formation of the optical effect, is increasingly lost.

Should the inorganic/organic coatings of the invention be used for improving the weather stability of pearlescent pigments, small layer thicknesses are sufficient and preferred. In this case, the layer thickness can be from 1.5 nm to 10 nm and preferably from 2 nm to 5 nm.

The two components of the mixed inorganic/organic layer can be distributed homogeneously across the thickness of the layer or even inhomogeously, for example, in the form of a gradient distribution such that the mixing ratio of the two components changes along the layer thickness. In the case of an inhomogeneous distribution of the individual components, the aforementioned limitations on the composition of the mixed layer apply to the average value across the thickness of the mixed layer. According to the invention, however, a substantially homogeneous, preferably homogeneous, distribution of the inorganic network and the organic oligomer and/or polymer is preferred.

The organic oligomers and/or polymers can, for example, also be present, at least in part, in the form of nano particles in the inorganic network to form the mixed inorganic/organic layer. However, it is possible for the inorganic oxide component to be present, at least in part, in the form of nano particles in the organic oligomer and/or polymer to form the mixed inorganic/organic layer. According to another variant of the invention, the mixed inorganic/organic layer in the nanoscalar range has a substantially homogeneous architecture such that the formation of inorganic nano particles in a substantially organic milieu of oligomers and/or polymers or the formation of organic nano particles in the form of oligomers and/or polymers in an inorganic milieu occurs less frequently. A homogeneous architecture is particularly achieved when a high fraction of organic network formers is used when producing the mixed inorganic/organic layer.

All common commercially available pearlescent pigments such as those mentioned below by way of example can be used as the platelet-shaped transparent substrate. For the purposes of the invention, the term "a platelet-shaped transparent substrate" means that the average transparency of the platelet-shaped substrate is from 1% to 99%, based on the incident light in the wavelength range of from 400 nm to 800 nm, and is preferably from 10% to 90%.

The pearlescent pigments usable as a platelet-shaped substrate have a platelet-shaped, transparent substrate core preferably selected from the group consisting of mica, talc, sericite, kaolin, and $SiO_2$, glass, graphite, and $Al_2O_3$ flakes, and mixtures thereof. Preferred substrate cores in this case are natural or synthetic mica and flakes of $SiO_2$, glass or $Al_2O_3$.

The transparent substrate core preferably consists of poorly refractive material, the latter term being used to indicate a refractive index of <1.8.

Furthermore, those $SiO_2$, glass, or $Al_2O_3$ flakes are preferred for use as substrate cores in which the standard deviation of thickness distribution is less than 20%, preferably less than 15%, and still more preferably less than 10%. These substrates have especially smooth surfaces. These substrates therefore allow for the production of particularly color-intense pearlescent pigments having strong color flops.

Glass flakes are particularly preferred, since they are the easiest to manufacture. An average thickness of the glass flakes of less than 1,000 nm, preferably less than 500 nm, and still more preferably less than 350 nm, is particularly preferred. Such thin glass flakes are particularly well suited for automobile applications, since the thickness of the basecoats used in these applications is very small (12 μm to 15 μm) and the trend is increasingly shifting toward even smaller layer thicknesses. Such thin substrate cores are the prerequisite for relatively thin pearlescent pigments, which can be oriented optimally only in such thin coating systems. Optimally oriented pigments give approximately optimum properties such as luster and color flop, for example. In pearlescent pigments comprising such thin substrate cores, the mixed inorganic/organic layer should again preferably have a relatively small thickness. The thickness of the mixed inorganic/organic layer is from 1 nm to 50 nm and preferably from 1.5 nm to 10 nm.

This platelet-shaped transparent substrate core of preferably low refractive index is coated with further layers, preferably of high refractive index. Layers of this kind are preferably selected from the group consisting of metal chalcogenides, especially metal oxides, metal hydroxides, hydrated metal oxides, metal suboxides, and metal sulfides, metal fluorides, metal nitrides, metal carbides, and mixtures thereof.

The substrate cores of the pearlescent pigments are preferably coated with a multilayer system comprising or consisting of highly refractive metal oxide, metal hydroxide, metal suboxide and/or hydrated metal oxide, the order of the layers being variable. The metal oxides, metal hydroxides, metal suboxides and/or hydrated metal oxides may also be present side-by-side in one and the same layer.

In order to produce a good pearl luster effect, the refractive index of the highly refractive metal oxide layer is greater than 1.8, preferably greater than 2.2, more preferably greater than 2.3, still more preferably greater than 2.4 and very preferably 2.5 or greater.

The substrate cores of the pearlescent pigments are preferably coated with one or more highly refractive metal oxide layers selected from the group consisting of or comprising $TiO_2$, $Fe_2O_3$, $Fe_3O_4$, $TiFe_2O_5$, $ZnO$, $SnO_2$, $CoO$, $Co_3O_4$, $ZrO_2$, $Cr_2O_3$ $VO_2$, $V_2O_3$, $(Sn,Sb)O_2$, and mixtures thereof. Particular preference is given to $TiO_2$ and/or $Fe_2O_3$. Particular preference is given to $TiO_2$ in the rutile modification.

In a further embodiment, the multilayer system features a layer order in which at least one layer of high refractive index and at least one layer of low refractive index are arranged in an alternating manner on a substrate core.

In the case of such an alternating arrangement, it is also possible for one or more layers of high refractive index to be disposed directly on top of one another followed by one or more layers of low refractive index disposed directly on top of one another. It is essential, however, that layers of both high and low refractive index be present in the layer system.

It is preferred for the multilayer system to feature a layer order in which at least one layer of high refractive index, at least one layer of low refractive index, and at least one layer of high refractive index are disposed in succession on a substrate core.

With this variant it is again possible for one or more layers of low refractive index or one or more layers of high refractive index to be disposed, in each case, directly one on top of the other. It is essential, however, that within the layer system, regarded from inside to outside, layers of high, of low, and again of high, refractive index are present.

Preferably at least one layer of high refractive index comprises or consists of metal oxide and/or metal hydroxide selected from the group consisting of $TiO_2$, $Fe_2O_3$, $Fe_3O_4$, $TiFe_2O_5$, $ZnO$, $SnO_2$, $CoO$, $Co_3O_4$, $ZrO_2$, $Cr_2O_3$ $VO_2$, $V_2O_3$, $(Sn,Sb)O_2$, and mixtures thereof. The layer of low refractive index preferably comprises or consists of metal oxide and/or metal hydroxide selected from the group consisting of $SiO_2$, $Al_2O_3$, $B_2O_3$, and mixtures thereof.

Pearlescent pigments having layers of high and low refractive index produce particularly intense interference colors. In particular, pearlescent pigments having a layer of high refractive index, a layer of low refractive index, and another layer of high refractive index are particularly preferred. A layer order comprising or consisting of $TiO_2/SiO_2/TiO_2$ and also, optionally, a layer comprising $Fe_2O_3$ produces intense gold hues and is particularly preferred.

In another embodiment, the platelet-shaped substrate consists of a glass flake as substrate coated on both sides with semitransparent metal layers.

The metals of the semitransparent metal layers are preferably selected from the group consisting of silver, aluminum, chromium, nickel, gold, platinum, palladium, copper, zinc, and mixtures and alloys thereof. The thicknesses of the semitransparent layers preferably range from approximately 2 nm to approximately 30 nm and more preferably from approximately 5 nm to approximately 20 nm.

The following platelet-shaped substrates are preferably used as platelet-shaped substrate provided, according to the invention, with the mixed inorganic/organic layer:
$TiO_2$-coated and/or iron oxide-coated mica flakes,
$TiO_2$-coated and/or iron oxide-coated glass flakes,
$TiO_2$-coated and/or iron oxide-coated alumina flakes,
$TiO_2$-coated and/or iron oxide-coated $SiO_2$ flakes,
bismuth oxychloride flakes,
pure $TiO_2$ flakes,
and mixtures of all these platelet-shaped substrates.

In the present invention, substrate cores coated with $TiO_2$ are preferably provided with the mixed inorganic/organic layer described above. Mica pigments coated with $TiO_2$ and/or iron oxide are available commercially, for example, under the name of PHOENIX® (Eckart). $Al_2O_3$ flakes coated with $TiO_2$ and/or iron oxide are supplied, e.g., by Engelhard, USA under the name of Firemist® or by Merck, Darmstadt, under the name of MIRAVAL®. Multilayer interference pigments such as those described, for example, in DE 196 18 569 and composed of a support material coated with alternating layers of metal oxides of low and high refractive index can also be coated in accordance with the invention.

Platelet-shaped are those substrates which have an aspect ratio (the ratio of average length to average thickness) of from 3 to 10,000, preferably from 5 to 5,000, and more preferably from 10 to 4,500. The size ratios of the platelet-shaped substrates are characterized by the average value ($d_{50}$-value) of the cumulative breakthrough curve as is usually measured with the help of laser diffraction methods. Sizes are preferred which show a $d_{50}$ of from 0.5 µm to 2,000 µm, more preferably from 1 µm to 1,500 µm and still more preferably from 2 µm to 1,000 µm.

In another development of the invention, the inorganic/organic modified layer is modified further by the use of network modifiers. Unlike organic network formers, network modifiers do not form any organic oligomers/polymers and do not polymerize with added organic monomers or with each other.

The organic network modifiers are reagents which contain both at least one hydrolyzable group and at least one organic group, which however need not necessarily be reactive or polymerizable.

Organic network modifiers are preferably compounds of the general formula (III)

$$R^1_n R^2_m R^3_o SiX_{(4-n-m-o)} \quad (III),$$

in which X is a hydrolyzable group, following the hydrolysis of which a covalent bond from the organic network modifier to the inorganic network can be formed, and $R^1$, $R^2$, and $R^3$ independently stand for a non-reactive organic group, provided that
n, m, and o are integers, where n+m+o=1 to 3 and n=1 to 3, m=0 to 2 and o=0 to 2,
and/or of the general formula (IV)

$$R^4_p MX_{(k-p)} \quad (IV),$$

in which the compound comprises at least one hydrolyzable group X, following the hydrolysis of which a covalent bond from the organic network modifier to the inorganic network can be formed, and has at least one non-reactive organic radical $R^4$, where
k is the formal oxidation number of M,
M stands for Al, Zr, or Ti, and
p is an integer from 1 to (k−1).

The hydrolyzable or condensable group X of the organic network modifiers is preferably selected from the group consisting of halogen, hydroxyl or alkoxy having from 1 to 10 carbon atoms, which can be linear or branched.

The organically functionalized groups $R^1$, $R^2$, and $R^3$ are preferably selected from the group consisting of H, alkyl groups, alkenyl groups, alkynyl groups, aryl groups, alkylaryl groups, arylalkyl groups, alkenylaryl groups, arylalkynyl groups, alkynylaryl groups, cycloalkyl groups, alkylcycloalkyl groups, cycloalkylalkyl groups, amino groups, hydroxyl groups, thiol groups, mercaptan groups, fluorinated alkyl groups, partially fluorinated alkyl groups, (partially) fluorinated aryl groups, (partially) fluorinated alkylaryl groups, acrylate groups, methacrylate groups, vinyl groups, epoxy groups, carboxyl groups, and ester groups. The radicals $R^1$, $R^2$ and $R^3$ preferably have chain lengths containing from 3 to 20 carbon atoms and more preferably from 5 to 15 carbon atoms. The radicals $R^1$, $R^2$, and $R^3$ can be cyclic, branched and/or linear and may contain heteroatoms such as O, S, and N in the carbon chain or the carbon ring system. As regards the length of the functional groups $R^1$, $R^2$, and $R^3$, reference is made to the corresponding statements concerning the organic network formers.

The aforementioned functionalities of the organic network modifiers are partly identical to those that are also used as organic network formers. The difference is that the functionalities in this case are not to react with each other nor with organic monomers or polymers. This will be the case when the functionalities of $R^1$, $R^2$, and $R^3$ differ, in terms of their chemical reactivity, from the functionalities of the monomers and also from those of the organic oligomers and/or polymers. The reaction can thus be controlled by way of the selection of the network modifiers and suitable monomers such that no reaction of network modifiers with each other occurs, nor with the monomers.

If, for example, a mixture of organofunctional silanes is exclusively used for forming the organic component, i.e. the organic oligomer and/or polymer, of the mixed layer, then all organofunctional silanes, the functional groups of which do not react with each other, will act as organic network modifiers.

Organofunctional silanes suitable for use as purely organic network modifiers are primarily compounds not containing functionalities having pronounced chemical reactivity. Among these, primarily ($C_1$-$C_{40}$)-alkyl functionalities, $(C_6-C_{36})$aryl functionalities, and perfluorinated or partially fluorinated $(C_1-C_{40})$alkyl functionalities, and/or $(C_6-C_{40})$aryl functionalities are to be understood as representative of radicals $R^1$, $R^2$, and $R^3$. The alkyl residues may be linear, branched or cyclic.

Examples thereof are: Propyltri(m)ethoxysilane, octyltri(m)ethoxysilane, dodecyltri(m)ethoxysilane, octadecyl-tri(m)ethoxysilane, phenyltri(m)ethoxysilane, diphenyldi(m)ethoxysilane, perfluorooctyl-tri(m)ethoxysilane, 1-,1-,2-,2-,3-,3-,4-,4-fluorooctyltri(m)ethoxysilane, 5-,5-,6-,6-,7-,7-,8-,8-,8-fluorooctyltri(m)ethoxysilane, and 1H-,1H-,2H-,2H-perfluorooctyltriethoxysilane (Dynasylan F 8261).

Examples of network modifiers containing Ti, Zr, or Al as the central atom are (see Ken-React Reference Manual—Titanate, Zirconate and Aluminate Coupling Agents by Salvatore J. Monte):
Isopropyltriisostrearyl titanate(IV) (KR TTS), isopropyltri(dioctyl)phosphato titanate(IV) (KR 12), isopropyltri(dodecyl)benzenesulfonyl titanate(IV) (KR 9S),
isopropyltri(dioctyl)pyrophosphato titanate(IV) (KR 38S), di(dioctyl)phosphatoethylene titanate(IV) (KR 212),
di(dioctyl)pyrophosphatoethylene titanate(IV) (KR 238S),
di(dioctyl)pyrophosphatooxoethylene titanate(IV) (KR 138S),
diisobuty(stearyl)acetoacetyl aluminate (KA 301).

In other developments of the invention, the transparent substrates can first be provided with one or more coatings, which are either only of inorganic or only of organic nature, before the mixed layer is applied. The production of such layers is well known to the person skilled in the art.

Metal oxide layers are preferred. Metal oxide layers containing or consisting of $SiO_2$ are particularly preferred.

The layer thicknesses of the purely inorganic or organic layers are between 2 nm and 1,000 nm, preferably between 5 nm and 500 nm and still more preferably between 7 nm and 50 nm.

The term "purely inorganic" layers here means layers having an organic fraction of less than 4% by weight. "Purely organic" layers means layers having an inorganic fraction of less than 4% by weight. The aforementioned percentages by weight are in each case based on the weight of the respective layer.

The reaction conditions used for coating with purely inorganic or purely organic layers before or after the application of the mixed layer can optionally differ from those that are required for the formation of the mixed layer. Thus, for example, the reaction temperature, the solvent, or the pH can be changed. This may require the reaction to be terminated and the intermediate product to be worked up, for example, by filtration and dehydration in vacuo before or after the deposition of the mixed inorganic/organic layer onto the substrate. However, coating with a purely inorganic layer or a purely organic layer is preferably carried out in the same medium as that used for coating the inorganic/organic mixed layer, giving a one-pot process.

It has been seen, surprisingly, that the application-related advantages of the increased mechanical stability of the mixed inorganic/organic layer are largely independent of whether or not additional purely inorganic or purely organic layers are present between the transparent substrate and the mixed layer and/or on the mixed layer itself. It may be of advantage to begin the coating method only with the inorganic component. In this way, it is possible to improve the adhesion of the subsequent mixed layer to the substrate. This is particularly true when the mixed layer comprises very hydrophobic components such as organic fluorinated functionalities, for example.

Additional coating of the mixed layer with a pure oxide layer, for example, is likewise advantageous. If need be, any desired surface modification can be carried out on this oxide layer much more readily than is possible in the case of the mixed layer. This is particularly true when the mixed layer comprises very hydrophobic components and/or a very high fraction of organic oligomers and/or polymers (e.g. >20% by weight).

In the case of a purely inorganic coating consisting of metal oxides/hydroxides, these are selected from oxides, hydrated metal oxides, suboxides and/or hydroxides of the elements silicon, titanium, aluminum, zirconium, iron, copper, zinc, cobalt, chromium, cerium, nickel, zinc, vanadium, tantalum, yttrium, molybdenum, tungsten, and mixtures thereof. The precipitation of such a layer onto pearlescent pigments is well known to the person skilled in the art. Such precipitation proceeds according to the following general procedure:

(a) The platelet-shaped substrate is dispersed in a solvent and brought to the reaction temperature.

(b) Then one or more metal compound(s) of the formula $MX_n$ are added, adjustment to a suitable pH range by the addition of suitable acids or bases and optional the addition of water. M, X, and n have the same meanings as stated above. M can additionally stand for Cu, Co, Ni, Sn, V, Ta, Y, Mo, and W. If desired, the oxide layer can alternatively be precipitated, following the deposition of the mixed inorganic/organic layer, onto said mixed inorganic/organic layer, in the same solvent.

(c) The reaction is carried out for a certain period of time and the batch is then cooled to room temperature. The product is subsequently separated from the solvent.

In the case of a purely organic coating, it can consist of poly(meth)acrylates, polyesters, polyurethanes, polyols, polyethers, or polyamides. The precipitation of such a layer onto pearlescent pigments is likewise well known to the person skilled in the art. This precipitation takes place according to the following general procedure:

(a) The platelet-shaped substrate is dispersed in a solvent and the suspension is brought to reaction temperature.

(b) Then one or more organic monomers and optionally polymer initiators are added and/or added dropwise, thereby forming an organic polymer layer. Prior to the application of the organic polymer layer, a suitable adhesion promoter can optionally be added in order to ensure better attachment of the polymers to the surface of the pearlescent pigment, as disclosed in DE 40 30 727.

(c) The coated pigment is finally separated from the reaction medium.

In additional developments of the invention, the pearlescent pigments, which comprise a mixed inorganic/organic layer, are provided with a surface modifier. Such surface modifiers are already known from DE 198 20 112. for example. With the help of such surface modifiers, the pearlescent pigments can be made compatible, in terms of their application properties, with the respective application medium used, which may be a coating material or a printing ink, for example. However, improvement in the mechanical stability of a coating cannot be achieved by surface modification alone.

Alternatively, the surface modifier can optionally be added following precipitation of the mixed inorganic/organic layer or the precipitation of one or more other inorganic layers, in the same solvent. The surface modifier can alternatively be dissolved in a suitable solvent and then applied to the pearlescent pigments in a mixer. Another alternative is to apply the surface modifier optionally in dry form to the pearlescent pigments of the invention, for example, by spray drying.

One variant of the method of the invention for the production of pearlescent pigments having a mixed inorganic/organic layer comprises the following steps:
(a) providing a reaction mixture of platelet-shaped metallic substrates in a liquid phase,
(b1) adding at least one inorganic network former to the reaction mixture provided in step (a),
(c1) hydrolyzing and/or condensing the inorganic network former added in step (b1),
(d1) adding at least one reactive organic network former and at least one reactive organic component prior to, during and/or following the hydrolysis and/or condensation carried out in step (c1),
or
(b2) adding at least one reactive organic network former and at least one reactive organic component to the reaction mixture provided in step (a),
(c2) adding at least one inorganic network former to the reaction mixture obtained in step (b2),
(d2) hydrolyzing and/or condensing the inorganic network former added in step (c2),
and
(e) causing the hydrolyzed and/or condensed inorganic network former to react with the reactive organic network former and the reactive organic component with concurrent and/or subsequent deposition of a mixed inorganic/organic layer on the platelet-shaped substrates, the mixed layer comprising, at least in part, an inorganic network comprising one or more inorganic oxide component(s), and at least one organic component, the organic component being, at least in part, an organic oligomer and/or polymer, which is covalently bonded, at least in part, to the inorganic network,
(f) optionally separating the platelet-shaped substrates coated in step (e) from the reaction mixture.

According to one variant, the method of the invention can be carried out based on steps (a), (b1), (c1), (d1), (e), and (f) or based on steps (a), (b2), (c2), (d2), (e), and (f).

The at least one reactive organic component is preferably added in the form of reactive, polymerizable organic monomers, oligomers, and/or polymers.

It is further preferred that at least one reactive oligomer and/or polymer be added as the reactive organic component.

According to a preferred development of the method of the invention, the reactive oligomer and/or polymer is selected from the group consisting of polyacrylates, polymethacrylates, polyethers, polyesters, polyamines, polyamides, polyols, polyurethanes, polyolefins, and mixtures thereof and is optionally caused to react with an organic network former for activation prior to addition to the reaction mixture or to the liquid phase.

It is further preferred that the reactive organic component be formed prior to the addition thereof by causing one or more different organic network formers having reactive groups $R^1$ to react with each other, optionally with the addition of polymerization initiators, and then adding the same.

The reactive, organic oligomer and/or polymer is preferably selected from the group consisting of silanol-terminated and/or methoxy-terminated silicones, polyarylalkylsilsesquioxanes, trialkoxysilane-modified polyethylene imines and aminosilane-modified polyethylene oxide urethanes.

According to another variant of the method of the invention, the reactive organic oligomer and/or polymer is selected from the group consisting of polyacrylates, polymethacrylates, polyethers, polyesters, polyamines, polyamides, polyols, polyurethanes, and polyolefins, which oligomers and/or polymers have reactive, non-polymerized functions.

In another variant of the method of the invention, at least one organic network modifier is additionally added prior to, during, and/or following the addition of the reactive organic component.

In other respects concerning the method of the invention, reference is made to the relevant statements concerning the pearlescent pigments of the invention.

Aqueous and/or organic solvents or solvent mixtures can be used as the liquid phase. Organic solvents in the form of alcoholic solutions having a water content of from 1% to 80% by weight, preferably from 2% to 30% by weight, and still more preferably from 3% to 10% by weight are preferred. A content of at least 1% by weight of water is necessary in order to hydrolyze the organic and inorganic network formers. The percentages by weight are each based on the total weight of the solvent.

All common solvents such as alcohols, ethers, ketones, esters, glycols or hydrocarbons or mixtures thereof can be used as organic solvents. For example, methanol, ethanol, n-propanol, isopropanol, n-butanol, or 2-butanol, or mixtures thereof are preferably used as alcohols.

The steps (b) to (e) of the coating procedure take place at reaction temperatures ranging from approximately 0° C. to approximately 100° C. and preferably from approximately 10° C. to approximately 80° C. The reaction temperatures are limited by the boiling point of the solvent or solvent mixture used.

The pH's in steps (b) to (e) range from 3 to 12 and preferably from 6 to 10.

Following the optional step (f), the pearlescent pigments coated according to the invention are subjected to size classification, for example, by sifting. Furthermore, they can be dried in a suitable unit. After separating the pigments from the reaction mixture, a change of solvent can be performed in that a different solvent from the one used for the reaction is added to the dried pigment powder. In this way, pastes can be produced which have a pearlescent pigment content of from 50% to 90% by weight, preferably from 60% to 75 by weight, always based on the weight of the paste.

The pearlescent pigments coated according to the invention are used in coating systems, paints, printing inks, powder paints, plastics, security printing inks, glass, ceramics, architectural coating compositions, and cosmetics. They are further used as laser markers.

The following exemplary embodiments are intended to illustrate the invention without restricting it thereto.

EXAMPLES

Example 1: Coating Pearlescent Pigments 100 g of iron oxide-coated mica (PHOENIX PX 1542, Eckart) were dispersed in 400 mL of isopropanol and brought to the boil. 10.0 g of demineralized water were then added. A solution of 15.0 g of tetraethoxysilane in 40.0 g of isopropanol was then continuously introduced over a period of 30 min using a metering pump (Ismatec). Concurrently, the addition of solution A (metering rate 1.0 mL/min) was initiated. 10 min following the commencement of the addition of tetraethoxysilane a solution B was additionally introduced also at the rate of 1.0 mL/min. 3 min after the commencement of the addition of solution B and another 30 min later a spatula tip of 2,2'-azo-bis(isobutyric nitrile) (AIBN) was added each time. On completion of the addition of solution B, the reaction mixture was stirred for a further 6 h under reflux. Following slow cooling to room temperature, stirring of the mixture was continued overnight. The reaction product was separated on a Buechner filter and dried over a period of 6 h in a vacuum drying cabinet at 80° C.

Solution A: 5.0 g of 25% strength aqueous NH$_4$OH, dissolved in 150 mL of isopropanol.

Solution B: 0.70 g of Dynasylan MEMO, 3.00 g of TMPTMA and 0.50 g of allyl methacrylate dissolved in 100 mL of isopropanol.

Comparative Example 2

Iron oxide-coated mica (PHOENIX PX 1542, supplied by Eckart), without further aftertreatment.

Comparative Example 3

Coating of pearlescent pigments containing SiO$_2$:

100 g of iron oxide-coated mica (PHOENIX PX 1542, Eckart) were dispersed in 400 mL of isopropanol and brought to the boil. 10.0 g of demineralized water were then added. A solution of 15.0 g of tetraethoxysilane in 40.0 g of isopropanol was then continuously introduced over a period of 30 min using a metering pump (Ismatec). Concurrently, the addition of solution A (metering rate 1.0 mL/min) was initiated. The reaction mixture was then stirred for a further 6 h under reflux. Following slow cooling to room temperature, stirring was continued overnight. The reaction product was separated on a Buechner filter and dried over a period of 6 h in a vacuum drying cabinet at 80° C.

fied in accordance with the present invention, 500 g of samples of granulated polycarbonate were produced in which the degree of pigmentation with pearlescent pigment was 1% in each case. The pigment and the predried plastics material were pregranulated in a twin-screw extruder at 260-280° C. and the resultant granules extruded once more under the same conditions for homogenization purposes. Subsequently, step chips were produced using an injection molding machine and evaluated with reference to luster and transparency.

The samples were extruded at various temperatures. During this procedure they were exposed to the extrusion temperature for approximately 5 min.

The transparency of the step chips was assessed visually at layer thicknesses of 1 mm in a similar manner to that specified in DIN 53230. The following rating applies:
Score 1: very good transparency
Score 2: good transparency
Score 3: fair transparency
Score 4: poor transparency
Score 5: very poor transparency In the case of mechanically instable pearlescent pigments, a portion of the iron oxide coating on the pearlescent pigments and also possibly any protective coating are torn off under the shearing conditions and thermal loads prevailing in the extruder. In addition, the pearlescent pigments may be damaged as a whole, ie, parts of the pigments may be fractured. Such destruction can lead to finely granulated portions present in the plastics material in addition to the pearlescent pigments. It leads to reduced transparency and can be viewed and assessed by means of an optical microscope. Quantitative assessment of the finely granulated portion was carried out under a microscope according to visual judgement. The samples were given the following grades as regards the finely granulated fraction thereof:
L: low
M: medium
H: high

TABLE 1

Assessment of the transparency and of the finely granulated fraction of polycarbonate step chips on being kept at various temperatures for five minutes.

| Sample | Transparency | | | | | | Finely granulated fraction | | | | | |
|---|---|---|---|---|---|---|---|---|---|---|---|---|
| | 260° C. | 280° C. | 300° C. | 320° C. | 340° C. | 360° C. | 260° C. | 280° C. | 300° C. | 320° C. | 340° C. | 360° C. |
| Example 1 | 1 | 1 | 1 | 1 | 1 | 1 | L | L | L | L | L | L |
| Comp. Ex. 2 | 3 | 4 | 4 | 4 | 4 | 5 | M | H | H | H | H | H |
| Comp. Ex. 3 | 3 | 3 | 3 | 3 | 4 | 4 | M | M | M | M | H | H |
| Comp. Ex. 4 | 3 | 4 | 4 | 4 | 4 | 5 | M | H | H | H | H | H |
| Comp. Ex. 5 | 3 | 3 | 3 | 3 | 4 | 4 | M | M | M | M | | |

Solution A: 5.0 g 25% ly strength aqueous NH$_4$OH, dissolved in 150 mL of isopropanol.

Comparative Example 4

Commercially available Iriodin 504 Red supplied by Merck, Darmstadt.

Comparative Example 5

Commercially available Mearlin Super Russet 9450 Z (supplied by Engelhard, USA).

A Production of Pearlescent Pigments in Polycarbonate by Melt Extrusion

Starting from unprocessed PHOENIX PX 1542, SiO$_2$-coated PHOENIX PX 1542 and PHOENIX PX 1542 modi- Table 1 clearly demonstrates the substantially better transparency of the plastics applications in the example relating to the invention compared with the comparative examples. The content of finely granulated material is correspondingly small. Although a certain degree of mechanical stabilization is achieved by coating an iron oxide-containing pearlescent pigment with SiO$_2$ (Comparative Example 3 compared with Comparative Example 2), the stabilizing action of the mixed organic/inorganic layer of the invention is considerably higher.

Experiments on Weather Stability

Example 6

100 g of commercially available blue pearlescent pigment based on TiO$_2$-coated mica of fineness 10 μm to 40 μm (PHOENIX PX 1261, supplied by Eckart) were dispersed in 400 mL of isopropanol and the dispersion was brought to the boil. 10.0 g of demineralized water were then added, after which a solution of 2.17 g of cerium nitrate hexahydrate in 100.0 g of isopropanol was introduced within one hour. Stirring was continued for 15 min and then a solution of 19.0 g of tetraethoxysilane in 40.0 g of isopropanol was continuously introduced over a period of 30 min using a metering pump (Ismatec). Concurrently, metering of solution A (metering rate 1.0 mL/min) and, by means of another metering pump, of solution B (metering rate likewise 1.0 mL/min) were initiated. 3 min following the commencement of the addition of solution B and another 30 min later a spatula tip of 2,2'-azo-bis(isobutyric nitrile) (AIBN) was added each time. On completion of the addition of solution B, the reaction mixture was stirred for a further 6 h under reflux. Following slow cooling to room temperature, stirring of the mixture was continued overnight. The reaction product was separated on a Buechner filter and dried over a period of 6 h in a vacuum drying cabinet at 80° C.

Solution A: 5.0 g of 25% strength aqueous $NH_4OH$, dissolved in 150 mL of isopropanol.

Solution B: 0.70 g of Dynasylan MEMO, 3.00 g of TMPTMA and 0.50 g of allyl methacrylate dissolved in 100 mL of isopropanol.

The pigment has a theoretical Ce content of 0.7% by weight and an $SiO_2$ content of 5.5% by weight. A carbon content of 1.2% by weight was determined.

Example 7

Coating is carried out using the same starting material as used in Example 6. However, on completion of the addition of solution B, the reaction mixture was stirred for a further 4 h under reflux. 1.7 g of Dynasylan OCTEO and 1.0 g of Dynasylan AMEO were then added, and the mixture was allowed to cool down slowly. The mixture was stirred overnight at room temperature and subjected to suction filtration the next day. The reaction product was separated on a Buechner filter and dried over a period of 6 h in a vacuum drying cabinet at 80° C.

Solution A: 5.0 g of 25% strength aqueous $NH_4OH$, dissolved in 65 mL of isopropanol.

Solution B: 0.70 g of Dynasylan MEMO, 3.00 g of TMPTMA and 0.50 g of allyl methacrylate dissolved in 100 mL of isopropanol.

The pigment has a theoretical cerium content of 0.7% by weight and an $SiO_2$ content of 6.0% by weight. A carbon content of 1.8% by weight was determined.

Example 8

Example 6 was repeated but without cerium deposition: 100 g of commercially available blue pearlescent pigment based on $TiO_2$-coated mica of fineness 10 µm to 40 µm (PHOENIX PX 1261, supplied by Eckart) were dispersed in 400 mL of isopropanol and the dispersion was brought to the boil. 10.0 g of demineralized water were then added, after which a solution of 19.0 g of tetraethoxysilane in 40.0 g of isopropanol was continuously introduced over a period of 30 min using a metering pump (Ismatec). Concurrently, metering of solution A (metering rate 1.0 mL/min) and, by means of another metering pump, of solution B (metering rate likewise 1.0 mL/min) were initiated. 3 min following the commencement of the addition of solution B and another 30 min later a spatula tip of 2,2'-azo-bis(isobutyric nitrile) (AIBN) was added each time. On completion of the addition of solution B, the reaction mixture was stirred for a further 6 h under reflux. Following slow cooling to room temperature, stirring of the mixture was continued overnight. The reaction product was separated on a Buechner filter and dried over a period of 6 h in a vacuum drying cabinet at 80° C.

Solution A: 5.0 g of 25% strength aqueous $NH_4OH$, dissolved in 65 mL of isopropanol.

Solution B: 0.70 g of Dynasylan MEMO, 3.00 g of TMPTMA and 0.50 g of allyl methacrylate dissolved in 100 mL of isopropanol.

The pigment has a theoretical $SiO_2$ content of 5.5% by weight.

A carbon content of 1.1% by weight was determined.

Example 9

Example 8 was repeated with organic surface modification. Coating was carried out using the same starting material as used in Example 6. However, on completion of the addition of solution B the reaction mixture was stirred for a further 4 h under reflux. 1.7 g of Dynasylan OCTEO and 1.0 g of Dynasylan AMEO were then added, and the mixture was allowed to cool down slowly. The mixture was stirred overnight at room temperature and subjected to suction filtration the next day. The reaction product was separated on a Buechner filter and dried over a period of 6 h in a vacuum drying cabinet at 80° C.

The pigment has a theoretical $SiO_2$ content of 6.0% by weight.

A carbon content of 1.7% by weight was determined.

Comparative Example 10

Commercially available PHOENIX PX 1261 (supplied by Eckart)

Comparative Example 11

Commercially available Exterior CFS Mearlin Super Blue 6303 Z (supplied by Engelhard).

B UV Resistance on Drawdowns

This test was carried out following the UV test described in EP 0 870 730 for the determination of the UV activity of $TiO_2$ pigments as a quick test on photochemical activity. To this end, 1.0 g of the pearlescent pigments of invention obtained in Examples 6 and 8 but not after treated with an organic surface modification was dispersed into 9.0 g of a melamine-containing coating system rich in double bonds. Drawdowns (thickness of the moist layer: 100 µm) on card-backed paper were produced and dried at room temperature. The drawdowns were cut in two and one of the two portions was stored in the dark as an unstressed control. The samples were then irradiated for 150 min in a QUV apparatus supplied by Q-Panel with UV-containing light (UVA-340 lamp, irradiance 1.0 W/ms2/nm). Immediately after testing, a colorimeter CM-508i supplied by Minolta was used to determine the tristimulus values of the stressed test pieces compared with the respective retained sample. The resultant $\Delta E^*$ indices are calculated according to the Hunter $L^*a^*b^*$ formula and are listed in Table 2.

In the test, a substantially grayish blue discoloration of the $TiO_2$ layer of the pearlescent pigment is observed in the drawdowns by reason of the Ti(III) centers formed under the influence of light. The reason for this is that the electron hole has departed from the $TiO_2$ and—for example as a result of reaction with olefinic double bonds in the binding agent— cannot directly recombine with the remaining electron. Since a melamine-containing layer of coating material or paint slows down the diffusion of water (vapor) and oxygen into the pigment surface considerably, reoxidation of the titanium(III) centers is delayed accordingly, and the degree of graying can thus be measured and the DE index taken as a measure of the light stability of the pigments. A high DE index of the stressed sample relative to the retained, unstressed sample thus denotes poor light stability of the pigment investigated.

TABLE 2

UV drawdown test results

| Sample | ΔE* |
|---|---|
| Example 6 | 1.2 |
| Example 8 | 4.6 |
| Comp. Example 10 | 16.6 |
| Comp. Example 11 | 2.3 |

With the change in colors ΔE* in the so-called drawdown test, the blue pigments of the examples relating to the invention are compared with those in Comparative Example 11 representing the prior art, lower values are observed for Example 6, thus indicating an even better resistance to light.

C Condensation Water Climate Resistance

The pigment samples were incorporated into a commercial water-based coating system and the test applications produced by spray-coating. The basecoat was overcoated with a commercial single-component clearcoat and then baked. The samples were weathered in a condensation water climate test as specified in DIN 50017 and immediately evaluated following termination of stressing and also one hour later.

The assessment of the degree of bubble formation was carried out visually in a similar manner to that specified in DIN 53209. The scale with the descriptors m (number of bubbles) and g (size of the bubbles) ranges from 0 (very good) to 5 (very poor; m5=very many bubbles and g5=very large bubbles).

The degree of swell and the DOI were likewise assessed visually as specified in DIN 53230 (scale 0-5, 0: no change, 5: severe change).

Assessment of the adhesion was performed by the cross-cutting test as specified in DIN 53151.

TABLE 3

Evaluation of the test sheets following condensation water climate stress

| Sample | Cross-cut (adhesion) | DOI | Degree of swell | Bubble formation |
|---|---|---|---|---|
| Example 7 (starting from PHOENIX PX 1261) | 0-1 | 1 | 1 | m2/g1 |
| Example 9 (starting from PHOENIX PX 1261) | 0 | 1 | 1 | m1/g1 |
| Comp. Example 10 (PHOENIX PX 1261) | 3 | 5 | 3 | m5/g1 |
| Comp. Example 11 (Engelhard Exterior CFS Mearlin Super Blue 6303Z) | 0 | 0 | 2 | m2/g1 |

In particular, the degree of swell in the examples relating to the invention is improved compared with the prior art.

TABLE 4

WOM test results

| Sample | Test duration (in h) | ΔE* | Gray scale |
|---|---|---|---|
| Example 7 | 500 | 0.1 | 5 |
| | 1000 | 0.2 | 5 |
| | 2000 | 0.2 | 5 |
| | 3000 | 0.3 | 4-5 |
| | 4000 | 0.3 | 4-5 |
| Example 9 | 500 | 0.2 | 5 |
| | 1000 | 0.3 | 5 |
| | 2000 | 0.5 | 4-5 |
| | 3000 | 0.8 | 4-5 |
| | 4000 | 1.2 | 4-5 |
| Comp. Example 11 (Exterior CFS Mearlin Super Blue 6303Z) | 500 | 0.4 | 5 |
| | 1000 | 0.5 | 5 |
| | 2000 | 0.8 | 4-5 |
| | 3000 | 0.8 | 4-5 |
| | 4000 | 1.0 | 4 |

A coating of the invention is thus able to effect distinct improvement in the weather and UV stabilities of the pearlescent pigments under investigation, as is shown by a comparison of the experimental results with those of Comparative Example 11 representing the prior art.

What is claimed is:

1. Pearlescent pigments comprising a coating and a platelet-shaped transparent substrate, wherein the coating comprises at least one mixed inorganic/organic layer having an average thickness of at least 10 nm, said mixed layer comprising at least in part an inorganic network having one or more inorganic oxide component(s) and at least one organic component, and the organic component is, at least in part, at least one of an organic oligomer and a polymer which is covalently bonded, at least in part, to the inorganic network via one or more organic network formers, and wherein said organic component is in a range of from 4% to 85% by weight, based on the weight of the entire mixed inorganic/organic layer, wherein the at least partial covalent bonding of the inorganic oxide component and organic oligomer and/or polymer takes place, at least in part, via one or more organic network formers, said organic network former having the general formula (I)

$$R^1_n R^2_m R^3_o SiX_{(4-n-m-o)} \quad (I)$$

in which X is a hydrolyzable group, following the hydrolysis of which a covalent bond can form between the organic network formers and the inorganic network, and $R^1$ is a reactive organic group, which can be covalently bonded to the at least one of an organic oligomer and a polymer, $R^2$ and $R^3$ are independently an organic group, which can be covalently bonded to the at least one of an organic oligomer and a polymer, provided that n, m and o are integers, where n+m+o=1 to 3 and n=1 to 3, m=0 to 2 and o=0 to 2.

2. The pearlescent pigments as defined in claim 1, wherein the inorganic oxide component of the mixed layer is selected from the group consisting of metal oxides, metal suboxides, metal hydroxides, hydrated metal oxides, and mixtures thereof.

3. The pearlescent pigments as defined in claim 2, wherein the inorganic oxide component of the mixed layer consists of at least one of a metal oxide, a metal hydroxide, a metal suboxide, and a hydrated metal oxide of elements selected from the group consisting of silicon, aluminum, titanium, zirconium, iron, cerium, chromium, manganese, zinc, tin, antimony, boron, magnesium, and mixtures thereof.

4. The pearlescent pigments as defined in claim 1, wherein the organic network former is a silane of the general formula (I) in which the hydrolyzable group(s) X are independently selected from the group consisting of halogen, hydroxyl and linear or branched alkoxy containing from 1 to 10 carbon atoms, and mixtures thereof.

5. The pearlescent pigments as defined in claim 1, wherein $R^1$ is a reactive organic radical which comprises one or more substituents selected from the group consisting of amino groups, hydroxyl groups, thiol groups, epoxy groups, acrylate groups, methacrylate groups, vinyl groups, allyl groups, alkenyl groups, alkynyl groups, carboxyl groups, carboxylanhydride groups, isocyanate groups, cyanate groups, ureido groups, carbamate groups, and mixtures thereof.

6. The pearlescent pigments as defined in claim 1, wherein $R^2$ and $R^3$ are independently selected from the group consisting of H-silanes, $(C_1-C_{40})$-alkyl silanes, fluorinated $(C_1-C_{40})$-alkyl silanes, partially fluorinated $(C_1-C_{40})$-alkyl silanes; $(C_2-C_{40})$-alkenyl silanes, $(C_2-C_{40})$-alkynyl silanes; $(C_6-C_{36})$-aryl silanes, fluorinated $(C_6-C_{36})$-aryl silanes, partially fluorinated $(C_6-C_{36})$-aryl silanes; $(C_7-C_{40})$-alkylaryl silanes, $(C_7-C_{40})$-arylalkyl silanes, fluorinated $(C_7-C_{40})$-alkylaryl silanes, partially fluorinated $(C_7-C_{40})$-alkylaryl silanes; $(C_8-C_{40})$-alkenylaryl silanes, $(C_8-C_{40})$-arylalkynyl silanes, $(C_8-C_{40})$-alkynylaryl silanes; $(C_5-C_{40})$-cycloalkyl silanes, $(C_6-C_{40})$-alkylcycloalkyl silanes, and $(C_6-C_{40})$-cycloalkylalkyl silanes, which can each be substituted by at least one of amino groups, hydroxyl groups, thiol groups, epoxy groups, acrylate groups, methacrylate groups, vinyl groups, allyl groups, alkenyl groups, alkynyl groups, carboxyl groups, carboxylanhydride groups, isocyanate groups, cyanate groups, ureide groups, carbamate groups, and ester groups wherein O, N, and S can be present as heteroatoms in the carbon chains and carbon ring systems, and mixtures thereof.

7. The pearlescent pigments as defined in claim 1, wherein the at least one of an organic oligomer and a polymer is formed from monomers having functionalities selected from the group consisting of amino groups, hydroxyl groups, thiol groups, epoxy groups, acrylate groups, methacrylate groups, vinyl groups, allyl groups, alkenyl groups, alkynyl groups, carboxyl groups, carboxylanhydride groups, isocyanate groups, cyanate groups, ureido groups, carbamate groups, and mixtures thereof.

8. The pearlescent pigments as defined in claim 1, wherein the organic component is formed from at least one of reactive organic oligomers and polymers comprising reactive groups capable of binding to at least one of the inorganic network and the group $R^1$ of the organic network former.

9. The pearlescent pigments as defined in claim 8, wherein the at least one of a reactive organic oligomer and a polymer is selected from the group consisting of trialkoxysilane-modified polyethylene imines or polyethylene oxide urethanes modified with aminosilane, and mixtures thereof.

10. The pearlescent pigments as defined in claim 8, wherein the at least one of a reactive organic oligomer and a polymer is selected from the group consisting of polyacrylates, polymethacrylates, polyethers, polyesters, polyamines, polyamides, polyols, polyurethanes, and polyolefins, wherein the at least one of the oligomer and the polymer have reactive functional groups which are capable of binding to the inorganic network or to an organic network former.

11. The pearlescent pigments as defined in claim 1, wherein the at least one of an organic oligomer and a polymer is covalently bonded via the functional group $R^1$ of one or more organic network formers in the mixed inorganic/organic layer.

12. The pearlescent pigment as defined in claim 1, wherein the mixed inorganic/organic layer is additionally modified by one or more organic network modifiers of the general formula (III)

$$R^1{}_nR^2{}_mR^3{}_oSiX_{(4-n-m-o)} \quad (III),$$

in which X is a hydrolyzable group, following the hydrolysis of which a covalent bond from the organic network modifier to the inorganic network can be formed, and $R^1$, $R^2$, and $R^3$ independently stand for a non-reactive organic group, provided that n, m, and o are integers, where n+m+o=1 to 3 and n=1 to 3, m=0 to 2 and o=0 to 2, and/or by one or more organic network formers of the general formula (IV)

$$R^4{}_pMX_{(k-p)} \quad (IV),$$

in which the compound comprises at least one hydrolyzable group X, following the hydrolysis of which a covalent bond from the organic network modifier to the inorganic network can be formed, and at least one non-reactive organic radical $R^4$, where k is the formal oxidation number of M, M stands for Al, Zr, or Ti, and p is an integer form 1 to (k−1).

13. The pearlescent pigments as defined in claim 1, wherein between the substrate and the mixed inorganic/organic layer there is disposed at least one separate, layer, said separate layer comprised of at least one selected from a pure inorganic layer and a pure organic polymer.

14. The pearlescent pigments as defined in claim 1, wherein on the mixed inorganic/organic layer there is disposed at least one separate, pure inorganic layer and/or at least one separate layer comprising a pure organic polymer.

15. The pearlescent pigments as defined in claim 13, wherein said separate, pure inorganic layers are comprised of at least one of a metal oxide, a hydrated metal oxide, a metal suboxide, and a metal hydroxide of elements selected from the group consisting of silicon, titanium, aluminum, zirconium, iron, copper, tin, cobalt, chromium, cerium, zinc, antimony, manganese, nickel, yttrium, molybdenum, vanadium, tantalum, tungsten, and mixtures thereof.

16. The pearlescent pigments as defined in claim 13, wherein said at least one separate, pure organic polymer is selected from the group consisting of polyacrylates, polymethacrylates, polyethers, polyesters, polyamines, polyamides, polyols, polyurethanes, polyphenolformaldehyde, polyolefins, poly-1,2,3,4-tetrafluoroethylene, and mixtures thereof.

17. The pearlescent pigments as defined in claim 1, wherein an additional layer containing one or more modifying agents is applied to the surface of the coated pearlescent pigment.

18. The pearlescent pigments as defined in claim 1, wherein the platelet-shaped substrate is selected from the group consisting of at least one of $TiO_2$-coated and iron oxide-coated mica flakes, at least one of $TiO_2$-coated and iron oxide-coated glass flakes, at least one of $TiO_2$-coated and iron oxide-coated alumina flakes, at least one of $TiO_2$-coated and iron oxide-coated $SiO_2$ flakes,
bismuth oxychloride flakes,
pure $TiO_2$ flakes,
and mixtures thereof.

19. The pearlescent pigments of claim 1, wherein the organic oligomers of the mixed inorganic/organic layer have a linking of two to twenty monomer units.

20. The pearlescent pigments of claim 1, wherein the organic polymers of the mixed inorganic/organic layer have a linking of more than twenty monomer units.

21. The pearlescent pigments of claim 1, wherein the platelet-shaped transparent substrate is selected from the group consisting of mica, talc, sericite, and $SiO_2$, glass, graphite and $Al_2O_3$ flakes and mixtures thereof.

22. Pearlescent pigments comprising a coating and a platelet-shaped transparent substrate, wherein the coating comprises at least one mixed inorganic/organic layer having an average thickness of at least 10 nm, said mixed layer comprising at least in part an inorganic network having one or more inorganic oxide component(s) and at least one organic component, and the organic component is, at least in part, at least one of an organic oligomer and a polymer which is covalently bonded, at least in part, to the inorganic network via one or more organic network formers, wherein the inorganic network and the organic oligomers and/or polymers of the mixed inorganic/organic layer exhibit interpenetration, and wherein said organic component is in a range of from 4% to 85% by weight, based on the weight of the entire mixed inorganic/organic layer, wherein the at least partial covalent bonding of the inorganic oxide component and organic oligomer and/or polymer takes place, at least in part, via one or more organic network formers, said organic network former having the general formula (I)

$$R^1{}_n R^2{}_m R^3{}_o SiX_{(4-n-m-o)} \qquad (I)$$

in which X is a hydrolyzable group, following the hydrolysis of which a covalent bond can form between the organic network formers and the inorganic network, and $R^1$ is a reactive organic group, which can be covalently bonded to the at least one of an organic oligomer and a polymer, $R^2$ and $R^3$ are independently an organic group, which can be covalently bonded to the at least one of an organic oligomer and a polymer, provided that n, m and o are integers, where n+m+o=1 to 3 and n=1 to 3, m=0 to 2 and o=0 to 2.

* * * * *